United States Patent [19]
Ziegler

[11] 3,739,518
[45] June 19, 1973

[54] FISHING TACKLE BOX

[76] Inventor: Raymond J. Ziegler, 16185 W. 14th Place, Golden, Colo. 80401

[22] Filed: Aug. 16, 1971

[21] Appl. No.: 172,053

[52] U.S. Cl. .............................. 43/57.5 R, 220/20
[51] Int. Cl. ........................................... A01k 97/06
[58] Field of Search .................. 43/57.5 R, 57.5 A, 43/54.5 R, 25.2; 220/20

[56] References Cited
UNITED STATES PATENTS

| | | | |
|---|---|---|---|
| 3,151,790 | 10/1964 | Maurakis | 43/54.5 R X |
| 3,332,164 | 7/1967 | Parrett, Jr. | 43/57.5 R |
| 3,350,810 | 11/1967 | Warner et al. | 43/57.5 R |
| 2,156,740 | 5/1939 | Schweigert | 43/57.5 R |
| 3,512,295 | 5/1970 | LaBarge | 43/57.5 R |
| 2,713,807 | 7/1955 | Herbert | 43/57.5 R X |
| 1,591,297 | 7/1926 | Dumouchel | 43/57.5 R |
| 2,809,766 | 10/1957 | Anderson | 220/20 X |

FOREIGN PATENTS OR APPLICATIONS

| | | | |
|---|---|---|---|
| 73,167 | 6/1951 | Norway | 43/57.5 R |

Primary Examiner—Louis G. Mancene
Assistant Examiner—James H. Czerwonky
Attorney—Bertha L. MacGregor

[57] ABSTRACT

A fishing tackle box or the like comprising front and rear box members hingedly connected at their bottoms, an exterior cover which engages both front and rear box members in closed position, and a mounting bar for fish hooks and other equipment. The mounting bar extends longitudinally of the front panel of the front box member near its upper edge, and a resilient pad in the cover overlies the mounting bar when the cover is closed to thereby retain said hooks and other equipment in intended positions. The rear panel of the rear box member is provided with a pair of spaced apart clips fastened at their ends to the said panel and spaced from the panel for reception of the belt of a user. A slot and pin arrangement limits relative pivotal movement of the front and rear box members.

3 Claims, 4 Drawing Figures

PATENTED JUN 19 1973 3,739,518
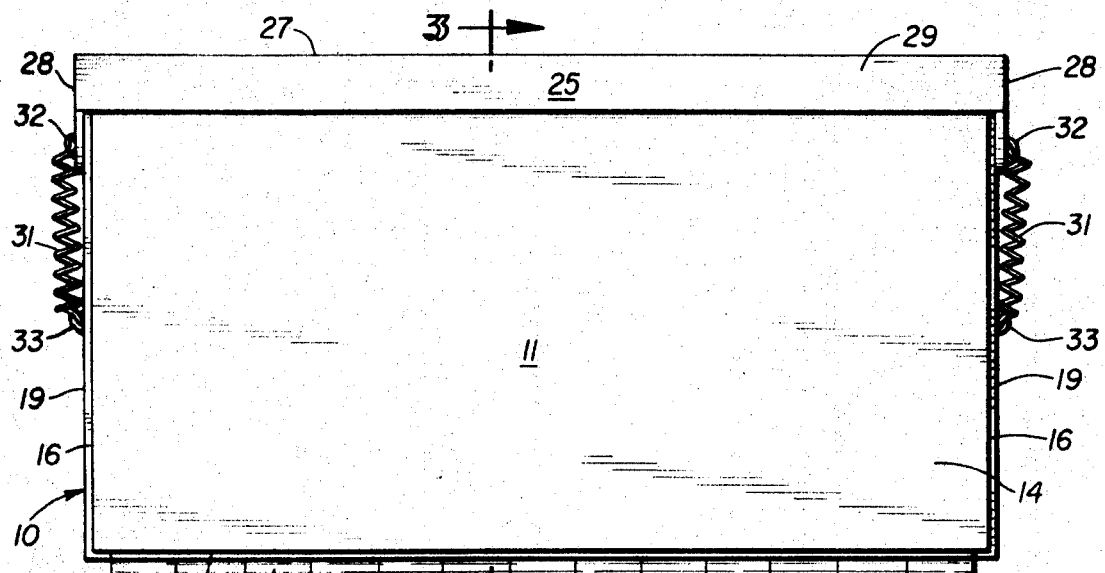
Fig. 1
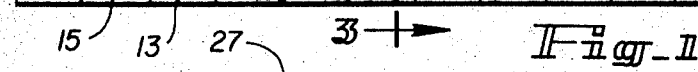
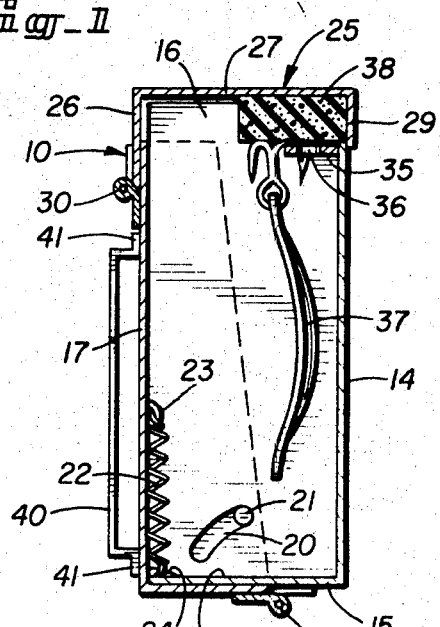
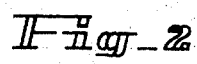
Fig. 2
Fig. 3
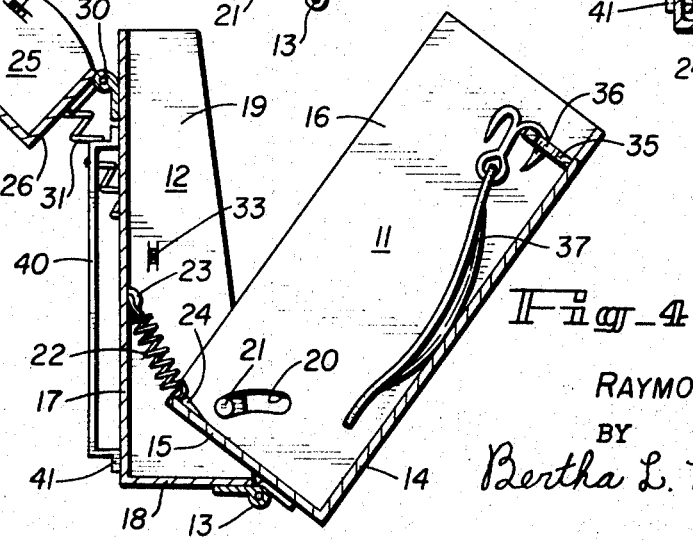
Fig. 4
INVENTOR.
RAYMOND J. ZIEGLER
BY
Bertha L. MacGregor
ATTORNEY

FISHING TACKLE BOX

This invention relates to a fishing tackle box designed to house and support fish hooks and other equipment in predetermined positions to prevent the box contents from becoming entangled and from resting on the box bottom in disorder.

The main object of the invention is to provide means within the box for mounting fish hooks and other equipment in conveniently accessible positions, permitting easy removal by the user when the box cover is raised, but cooperating with the cover of the box to retain the contents in their intended positions when the cover is closed.

Another object of the invention is to provide means on the outer surface of the box for use in attaching the box to the belt of the user in such position that the box is in upright position, with the cover at the top and the box contents conveniently accessible when the cover is opened.

Another object of the invention is to provide spring controlled hinge means connecting two body members of the box and for connecting a cover to one of said body members, whereby the parts are biased to their open positions when they have been manually moved to pivotally raise the cover and pivotally separate the body members, and whereby the parts are biased to their closed positions when the user has manually moved one body part toward the other and lowered the cover to closed position.

In the drawings:

FIG. 1 is a front elevational view of a fishing tackle box embodying my invention.

FIG. 2 is an end elevational view of the same.

FIG. 3 is a transverse vertical sectional view in the plane of the line 3—3 of FIG. 1.

FIG. 4 is a view similar to FIG. 3 showing the box members and cover in open positions.

In the embodiment of the invention shown in the drawings, the body of the tackle box 10 comprises a front member 11 and a rear member 12, hingedly connected by a hinge 13 which extends longitudinally of the box from one end to the other. The box member 11 consists of a front panel 14, bottom 15 and two end panels 16. The box member 12 consists of a rear panel 17, bottom 18 and two end panels 19. The hinge 13 is located so that one of the hinge plates is attached to the front box member bottom 15 between its longitudinal edges while the other of the hinge plates is attached to the rear box member bottom 18 adjacent its forward longitudinal edge, as best shown in the sectional views of FIGS. 3 and 4. This arrangement permits the major portion of the front box member bottom 15 to overlie the bottom 18 of the rear box member. The end panels 16 are provided with arcuate slots 20 and the end panels 19 are provided with pins 21 to cooperate with the slots 20 to limit the pivotal movement of the two body members 11 and 12 about the hinge 13 relatively to each other, as shown in FIG. 4. A spring 22 is fastened to the inner surface of the rear panel 17 by any suitable means 23 and to the bottom 15 of the front member by means 24.

A cap or cover 25 consists of a rear wall 26, top 27, ends 28 and a front wall 29 shorter than the rear wall 26. The cover 25 is hingedly connected to the rear panel 17 of the box member 12 by a hinge 30 comprising a plate fastened to the rear wall 26 of the cover and another plate fastened to the rear panel 17 of the box member 12. The location of the hinge 30 is such that the cover can be swung from its closed position of FIGS. 2 and 3 where it engages both box members, to the open position of FIG. 4, entirely clear of the box members 11 and 12. A spring 31 is attached to the ends 28 of the cover 25 by any suitable means 32 and to the ends 19 of the rear box member 12 by means 33.

An important feature of my invention is the means for mounting fish hooks and other equipment in the box 10 in conveniently accessible positions for easy removal and replacement, and for retaining the box contents in selected positions. For this purpose, the front box member 11 is provided with a longitudinally extending bar having a row of apertures 36 extending through the bar from top to bottom, said bar 35 being mounted on the front panel 14 near its upper edge. Fish hooks 37 and other equipment may be mounted on the bar 35 as indicated in FIGS. 3 and 4.

Cooperating with the bar 35 to retain the fish hooks 37 and the like in intended positions when the tackle box is closed, the cover 25 is provided with a pad 38 made of sponge rubber or other resilient material, extending longitudinally between the ends 28 of the cover adjacent the front wall 29 and top 27, so as to overlie the mounting bar 35 and hooks 37 as shown in FIG. 3.

The box 10 can be attached to the belt of a user by a pair of belt clips 40 mounted on the rear panel 17 of the box member 12, as shown in FIGS. 2–4, the clips preferably being made of rigid material and spaced from the panel 17 between the upper and lower ends 41 which are fastened to the panel 17 by any suitable means.

When the box 10 is closed, the front box member 11 fits within the rear box member 12 and the bottom and ends of the assembled box are reinforced, with the cover serving to close the top of the box and also to hold the box members 11 and 12 firmly in closed positions. To open the box, the cover 25 must be moved manually to overcome the tension of the spring 31, and the members 11 and 12 or one of them must be moved manually to open position as shown in FIG. 4. When the cover 25 is in closed position, the pad 38 bears on the hooks 37 or other equipment mounted in the bar 35 and retains them in their intended positions.

I claim:

1. A fishing tackle box or the like comprising
   a. a front box member having a front panel, bottom and two end walls,
   b. a rear box member having a rear panel, bottom and two end walls,
   c. a hinge connecting the bottoms of the front and rear box members,
   d. a cover comprising a top, front, rear and two end walls connected together having its rear wall hingedly connected to the rear wall of the rear box member and engaging both said rear and front walls of the said box members when closed, with the rear cover wall overlapping the rear wall of the rear box member,
   e. an apertured fishing lure mounting bar extending longitudinally of the front wall of the front box member adjacent the upper edge of the said front wall,
   f. a resilient pad in the cover adjacent the front cover wall and top bearing on said mounting bar when the cover is in closed position, g. a tension spring fastened at one end to the interior of the rear panel of the rear box member and at the other end to the bottom of the front box member, and h. at least one additional tension spring fastened at one end to one of the ends of the cover and at the other end to one of the ends of the rear box member, said additional spring holding the cover down on the front and rear box members when in closed position and causing the resilient pad to bear on the mounting bar without latch means; and said first mentioned spring holding the cover in open position when it has been moved rearwardly beyond the rear wall of the rear box member.

2. The fishing tackle box or the like defined by claim 1, which includes a pair of closed rigid clips spaced apart longitudinally of the box and fastened to the rear panel of the rear box member in spaced relation thereto for reception of the user's belt between the clips and the said panel.

3. A fishing tackle box comprising a. a front box member having a front panel, bottom and two end walls, b. a rear box member having a rear panel, bottom and two end walls, c. a hinge connecting the bottoms of the front and rear box members, d. an exterior cover hingedly connected to one of the box members and engaging both said members when closed, e. a mounting bar extending longitudinally of one of said box members near its top, and f. a resilient pad in the cover bearing on said mounting bar when the cover is in closed position, said box member end walls being provided, respectively, with a slot and pin which engage to limit the pivotal movement of said box members relatively to each other.

* * * * *